(12) United States Patent
Jeong

(10) Patent No.: US 11,577,580 B2
(45) Date of Patent: Feb. 14, 2023

(54) HEAT EXCHANGE SYSTEM FOR VEHICLE

(71) Applicants: HYUNDAI MOTOR COMPANY, Seoul (KR); Kia Corporation, Seoul (KR)

(72) Inventor: Seong-Bin Jeong, Hwaseong-si (KR)

(73) Assignees: HYUNDAI MOTOR COMPANY, Seoul (KR); Kia Corporation, Seoul (KR)

(*) Notice: Subject to any disclaimer, the term of this patent is extended or adjusted under 35 U.S.C. 154(b) by 29 days.

(21) Appl. No.: 17/380,534

(22) Filed: Jul. 20, 2021

(65) Prior Publication Data

US 2022/0134841 A1    May 5, 2022

(30) Foreign Application Priority Data

Nov. 4, 2020 (KR) .......... 10-2020-0146178

(51) Int. Cl.
*F25B 7/00* (2006.01)
*B60H 1/00* (2006.01)
*B60H 1/14* (2006.01)

(52) U.S. Cl.
CPC ..... *B60H 1/00921* (2013.01); *B60H 1/00278* (2013.01); *B60H 1/143* (2013.01); *B60H 2001/00307* (2013.01); *B60H 2001/00928* (2013.01); *B60H 2001/00949* (2013.01)

(58) Field of Classification Search
CPC ............ B60H 1/00921; B60H 1/00278; B60H 1/143; B60H 2001/00307; B60H 2001/00928; B60H 2001/00949
USPC .......................................................... 62/79
See application file for complete search history.

(56) References Cited

FOREIGN PATENT DOCUMENTS

| CN | 106246334 | * | 11/2019 |
|---|---|---|---|
| FR | 3093357 | * | 9/2020 |
| JP | WO2013080534 | * | 6/2013 |

* cited by examiner

*Primary Examiner* — Davis D Hwu
(74) *Attorney, Agent, or Firm* — Lempia Summerfield Katz LLC

(57) ABSTRACT

A heat exchange system for a vehicle includes: a heat exchange module disposed at a rear, in a length direction, of a vehicle body, formed of a plurality of plate-shaped plates including a plurality of through-holes; a radiator installed at a front, in the length direction, of the vehicle body; a heating, ventilation, and air conditioning (HVAC) module disposed at the rear, including an air conditioning cases that includes an evaporator, an indoor condenser, and an opening/closing door provided therein; an electric compressor; a rear driving motor disposed at the rear; an autonomous driving controller disposed at the rear; and a switching valve including a first valve installed on a first refrigerant line, a second valve installed on a second refrigerant line; and a third valve installed on a third refrigerant line.

17 Claims, 15 Drawing Sheets

(a)

(b)

HEAT EXCHANGE SYSTEM FOR VEHICLE

CROSS-REFERENCE TO RELATED APPLICATION

This application claims priority to and the benefit of Korean Patent Application No. 10-2020-0146178, filed on Nov. 4, 2020, the entire contents of which are incorporated herein by reference.

FIELD

The present disclosure relates to a heat exchange system for a vehicle.

BACKGROUND

The statements in this section merely provide background information related to the present disclosure and may not constitute prior art.

Generally, an electric vehicle is operated by using a driving motor that receives electricity from a battery module as a power source.

The electric vehicle does not emit carbon dioxide, has low noise, and energy efficiency of the driving motor thereof is higher than that of an internal combustion engine, so the electric vehicle is spotlighted as an environment-friendly vehicle.

A core technology in implementing the electric vehicle described above is a technology related to a battery module, and recently, studies on weight reduction, miniaturization, and reduction of charging time of the battery module have been actively conducted.

The battery module should be used in an optimum temperature environment to maintain optimum performance and long life.

However, in a current situation, it is difficult to use the battery module in the optimal temperature environment due to heat generated during operation and external temperature change.

In addition, the electric vehicle does not have a waste heat source generated during combustion in an internal combustion engine like the internal combustion engine, so vehicle indoor heating in winter is performed with an electric heating device.

In addition, since the electric vehicle needs warm-up to improve battery charging/discharging performance in cold weather, a separate coolant heating type of electric heater is provided.

In other words, the electric vehicle employs a technology of operating a cooling/heating system for temperature control of the battery module separately from a cooling/heating system for indoor air conditioning of the vehicle in order to maintain the optimal temperature environment of the battery module.

That is, the electric vehicle according to the prior art has two independent cooling and heating systems, one used for indoor cooling and heating, and the other used for temperature control of the battery module.

The cooling and heating system for the electric vehicle according to the prior art has a disadvantage of increased number of parts, a large installation space, and increased weight of the vehicle.

In the electric vehicle according to the prior art, the increased weight is directly related to the fuel economy.

On the other hand, recently, as well as the electric vehicle, there is a trend that an autonomous driving controller is added even to a vehicle of a general specification, and the autonomous driving controller is a fundamental component of vehicle control.

Like the battery module, such an autonomous driving controller desires a cooling and heating system so that it may operate in a guaranteed temperature range.

A heater core is provided inside a heat, ventilation, and air conditioning (HVAC) module for the purpose of effectively cooling and heating the autonomous driving controller as described above.

The heater core serves to increase a temperature of air for air conditioning by heat-exchanging a coolant heated by a heater with air flowing through the inside of the HVAC module.

In this case, the HVAC module is connected to a main heat exchanger, a receiver dryer, an expansion valve, an accumulator, a compressor, and the like through a refrigerant line.

The inside of the HVAC module is provided with an opening/closing door which controls the air passing through the evaporator to selectively flow into an indoor condenser and the heater core according to a cooling mode, a heating mode, and a dehumidifying mode of the vehicle.

The opening/closing door is opened so that outside air passing through the evaporator flows into the indoor condenser and the heater core in the heating mode of the vehicle.

Conversely, the opening/closing door at the indoor condenser and heater core side is closed so that outside air cooled while passing through the evaporator in the cooling mode of the vehicle is directly introduced into the vehicle.

Most of the HVAC modules according to the prior art are disposed in front of the vehicle in which the engine room is installed based on the length of the vehicle body as desired, and when the HVAC module is disposed at the rear side of the vehicle in which the trunk is positioned, since it is inevitable to adopt a method of branching and extending the refrigerant line from the cooling system disposed in the engine room, the performance of the rear HVAC module may be degraded, resulting in a decreased efficiency.

In consideration of the above-described disadvantages, we have discovered that research and development of a heat exchange system that improves the cooling and heating of the HVAC module disposed at the rear of the vehicle, and the cooling efficiency and performance of the autonomous driving controller disposed at the rear of the vehicle corresponding thereto are desired.

The above information disclosed in this Background section is only for enhancement of understanding of the background of the disclosure, and therefore it may contain information that does not form the prior art that is already known to a person of ordinary skill in the art.

SUMMARY

The present disclosure provides a heat exchange system for a vehicle that may reduce a package space by performing heat exchange between an HVAC module, an electric compressor, a rear driving motor, and an autonomous driving controller disposed at the rear of the vehicle through one heat exchange module.

One form of the present disclosure provides a heat exchange system for a vehicle, including: a heat exchange module that is disposed at a rear, in a length direction, of the vehicle, in which a plurality of plate-shaped plates having a plurality of through-holes are overlapped in a predetermined section in a cross-sectional view, and that includes a first heat exchange region including a first coolant flow passage, an oil flow passage, and a first refrigerant flow passage, and a second heat exchange region including a second coolant flow passage and a second refrigerant flow passage, through the through-holes; a radiator that is installed in a front, in the length direction, of the vehicle body, and in which heat exchange is performed while a first coolant circulating therein passes through the first coolant flow passage; an HVAC (heating, ventilation, and air conditioning) module that is disposed at the rear, in the length direction, of the vehicle, in which an evaporator, an indoor condenser, and an opening/closing door are provided inside an air conditioning case thereof, and that controls a direction of indoor air by operating the opening/closing door according to a cooling mode and a heating mode; an electric compressor that discharges a refrigerant to the indoor condenser between the heat exchange module and the HVAC module; a rear driving motor that is disposed at the rear based on the length direction of the vehicle, and in which heat exchange is performed with the first coolant while a cooling oil circulating therein passes through the oil flow passage; an autonomous driving controller that is disposed at the rear based on the length direction of the vehicle, and in which heat exchange is performed with the refrigerant while a second coolant circulating therein passes through the second coolant flow passage; and a switching valve including a first valve installed on a first refrigerant line between the indoor condenser and the first heat exchange region, a second valve installed on a second refrigerant line between the first heat exchange region and the second heat exchange region to connect a branch line branched from the second refrigerant line, and a third valve installed on a third refrigerant line connected to an electric compressor via the second heat exchange region and the indoor condenser to be connected to a fourth refrigerant line branched from the third refrigerant line.

The heat exchange module may be provided with through-holes on each of the plates formed along the length direction of the vehicle body, and is mounted on an upper surface of the rear driving motor through a mounting bracket.

In the heat exchange module, a flange bent in one direction may be formed along a circumference of each of the plates, and the first heat exchange region and the second heat exchange region may be divided by a diaphragm formed at a center portion in a length direction of each of the plates.

The first heat exchange region may have a structure in which a first coolant is circulated through a first coolant line connecting the radiator and the first coolant flow passage, a cooling oil is circulated through an oil line connecting the rear driving motor and the oil flow passage, and a refrigerant is circulated through the first refrigerant line, so that heat exchange of the first coolant and the cooling oil may be performed through the refrigerant.

The second heat exchange region may have a structure in which a second coolant is circulated through a second coolant line connecting the autonomous driving controller and the second coolant flow passage, a refrigerant flows in from the second refrigerant line, and the refrigerant is circulated through the third refrigerant line and the fourth refrigerant line so that heat exchange of the second coolant may be performed through the refrigerant.

The first valve may be an expansion valve disposed at an upper side of the heat exchange module and circulating a refrigerant discharged from the indoor condenser into the first refrigerant flow passage.

The second valve may be an expansion valve disposed adjacent to the first valve and interconnecting a branch line connected to one side of the third refrigerant line and the second refrigerant line to circulate the refrigerant.

The third valve may be an expansion valve disposed adjacent to the second valve and selectively circulating a refrigerant through the third refrigerant line and the fourth refrigerant line.

The electric compressor may be fastened to at least two points on a housing of the rear driving motor, and may be fastened to the housing of the rear driving motor through a connecting bracket that absorbs vibrations of a vehicle body.

The autonomous driving controller may be fastened to at least two points on one side of an upper surface of a rear cross member.

In a case of cooling the autonomous driving controller in a cooling mode of the vehicle, the first refrigerant may be circulated to the indoor condenser from the electric compressor; the first valve may be opened, and the first refrigerant may be circulated to the first heat exchange region to perform heat exchange of the first coolant; the second valve may expand the refrigerant to form the first refrigerant into a second refrigerant that is relatively cooler than the first refrigerant, may close the branch line, open a passage of a second heat exchange region side, and circulate the second refrigerant to the second heat exchange region to perform heat exchange of the second coolant; and the third valve may close the fourth refrigerant line and may open the third refrigerant line to circulate the second refrigerant to the evaporator.

In a case of cooling the autonomous driving controller in a cooling mode off-state and a heating mode off-state of the vehicle, the first refrigerant may be circulated to the indoor condenser from the electric compressor; the first valve may be opened, and the first refrigerant may be circulated to the first heat exchange region to perform heat exchange of the first coolant; the second valve may expand the refrigerant to form the first refrigerant into a second refrigerant that is relatively cooler than the first refrigerant, may close the branch line, may open a passage of a second heat exchange region side, and may circulate the second refrigerant to the second heat exchange region to perform heat exchange of the second coolant; and the third valve may close the third refrigerant line and may open the fourth refrigerant line to circulate the second refrigerant to the electric compressor.

In a case of cooling the autonomous driving controller in a heating mode of the vehicle, the first refrigerant may be circulated to the indoor condenser from the electric compressor; the first valve may expand the refrigerant to form the first refrigerant into a second refrigerant that is relatively cooler than the first refrigerant, and may circulate the second refrigerant to the first heat exchange region to perform heat exchange of the first coolant; the second valve may open a passage of a second heat exchange region side and may circulate the second refrigerant to the second heat exchange region to perform heat exchange of the second coolant; and the third valve may close the third refrigerant line and may open the fourth refrigerant line to circulate the second refrigerant to the electric compressor.

In a case of cooling the autonomous driving controller in a heating mode and a dehumidifying mode of the vehicle, the first refrigerant may be circulated to the indoor condenser from the electric compressor; the first valve may expand the refrigerant to form the first refrigerant into a second refrigerant that is relatively cooler than the first refrigerant, and may circulate the second refrigerant to the first heat exchange region to perform heat exchange of the first coolant; the second valve may open a passage of a second heat exchange region side and may circulate the second refrigerant to the second heat exchange region to perform heat exchange of the second coolant; and the third valve may close the fourth refrigerant line and may open the third refrigerant line to circulate the second refrigerant to the evaporator.

In a case of not cooling the autonomous driving controller in a cooling mode of the vehicle, the first refrigerant may be circulated to the indoor condenser from the electric compressor; the first valve may be opened, and the first refrigerant may be circulated to the first heat exchange region to perform heat exchange of the first coolant; the second valve may close a passage of a second heat exchange region side, may open the branch line, and may circulate the first refrigerant to the third refrigerant line through the branch line; and the third valve may expand the refrigerant to form the first refrigerant into a second refrigerant that is relatively cooler than the first refrigerant, and may close the fourth refrigerant line and may open the third refrigerant line to circulate the second refrigerant to the evaporator.

In a case of not cooling the autonomous driving controller in a heating mode of the vehicle, the first refrigerant may be circulated to the indoor condenser from the electric compressor; the first valve may expand the refrigerant to form the first refrigerant into a second refrigerant that is relatively cooler than the first refrigerant, and may circulate the second refrigerant to the first heat exchange region to perform heat exchange of the first coolant; the second valve may close a passage of a second heat exchange region side, may open the branch line, and may circulate the second refrigerant to the third refrigerant line through the branch line; and the third valve may close the third refrigerant line of an evaporator side and may open the fourth refrigerant line to circulate the second refrigerant to the electric compressor.

In a case of not cooling the autonomous driving controller in a heating mode and a dehumidifying mode of the vehicle, the first refrigerant may be circulated to the indoor condenser from the electric compressor; the first valve may expand the refrigerant to form the first refrigerant into a second refrigerant that is relatively cooler than the first refrigerant, and may circulate the second refrigerant to the first heat exchange region to perform heat exchange of the first coolant; the second valve may close a passage of a second heat exchange region side, may open the branch line, and may circulate the second refrigerant to the third refrigerant line through the branch line; and the third valve may close the fourth refrigerant line and may open the third refrigerant line to circulate the second refrigerant to the evaporator.

According to the heat exchange system for the vehicle of the form of the present disclosure, it is possible to reduce a package space by performing heat exchange between an HVAC module, an electric compressor, a rear driving motor, and an autonomous driving controller disposed at the rear of the vehicle through one heat exchange module.

In other words, the heat exchange system for the vehicle may implement an independent refrigerant circuit by arranging all of a heat exchange module, an HVAC module, an electric compressor, a rear driving motor, an autonomous driving controller, and a switching valve at the rear of the vehicle.

In addition, according to the heat exchange system for the vehicle of the form of the present disclosure, since the heat exchange module and the switching valve are modularized, the installation space may be reduced and the in-line working man-hours may be reduced.

In addition, effects that may be obtained or expected from forms of the present disclosure are directly or suggestively described in the following detailed description. That is, various effects expected from forms of the present disclosure will be described in the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 14:
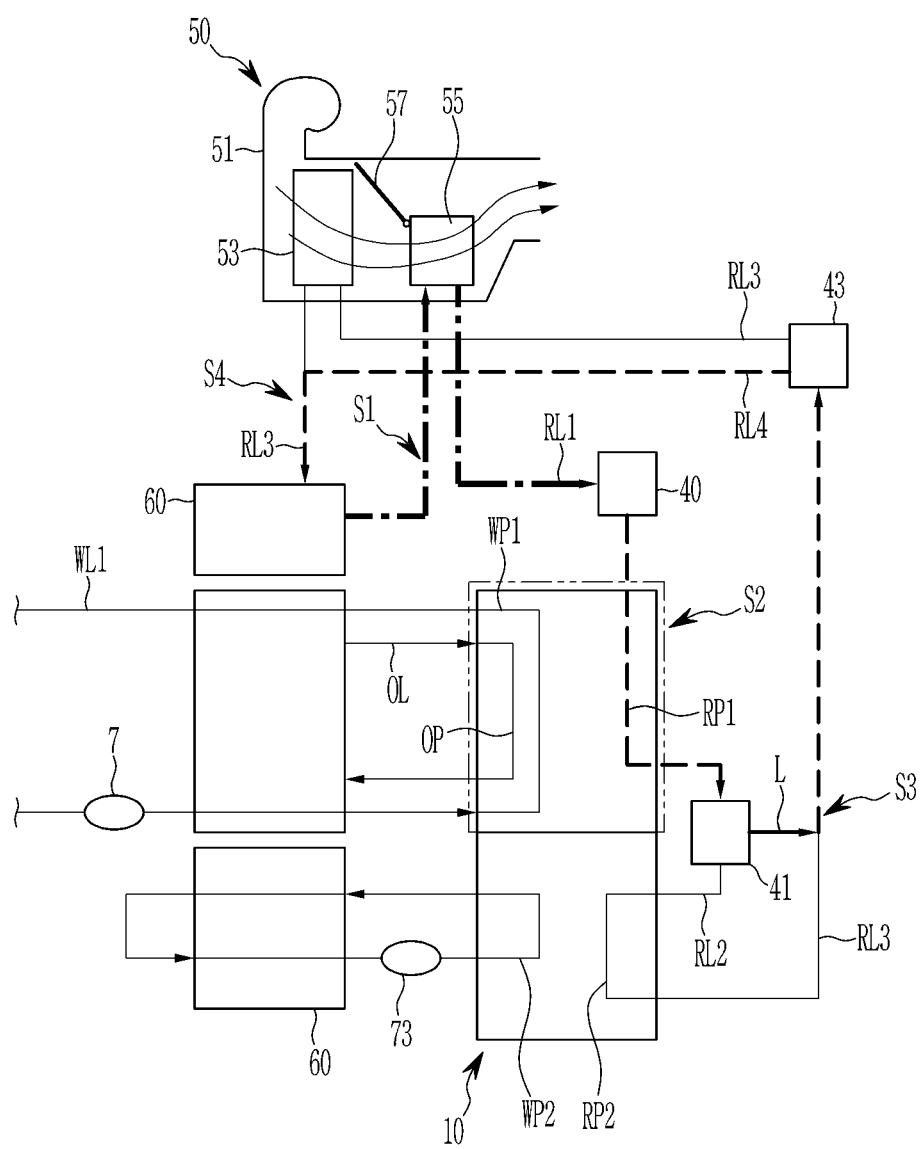
Figure 15:
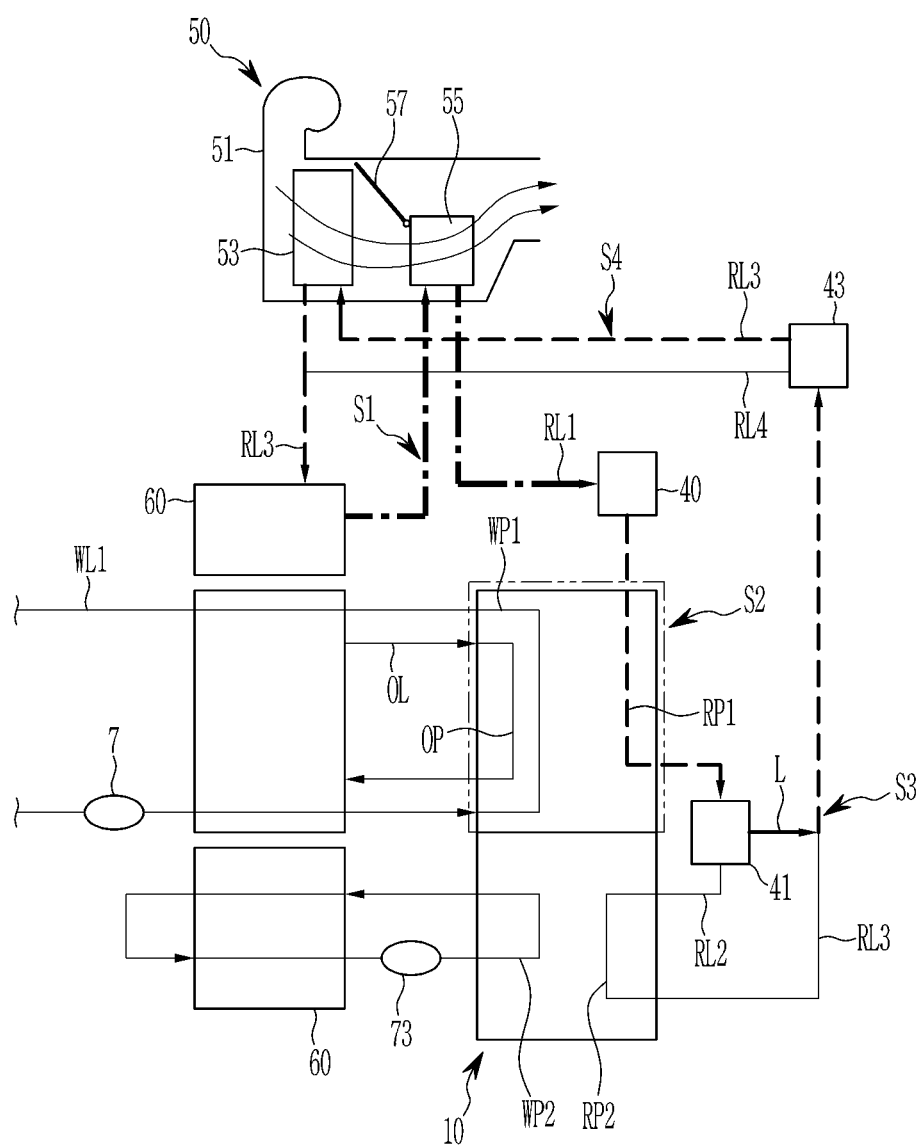

FIG. 14 illustrates a view for explaining operation of a heat exchange system for a vehicle according to one form of the present disclosure when not cooling the autonomous driving controller 70 in the heating mode of the vehicle; and FIG. 15 illustrates a view for explaining operation of a heat exchange system for a vehicle according to one form of the present disclosure when not cooling the autonomous driving controller in the heating and the dehumidifying mode of the vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure will be described more fully hereinafter with reference to the accompanying drawings, in which various forms of the disclosure are shown. As those skilled in the art would realize, the described forms may be modified in various different ways, all without departing from the spirit or scope of the present disclosure.

In order to clearly describe the present disclosure, parts that are irrelevant to the description are omitted, and identical or similar constituent elements throughout the specification are denoted by the same reference numerals.

In the following description, dividing names of components into first, second, and the like is to divide the names because the names of the components are the same as each other and an order thereof is not particularly limited.

Figure 1:
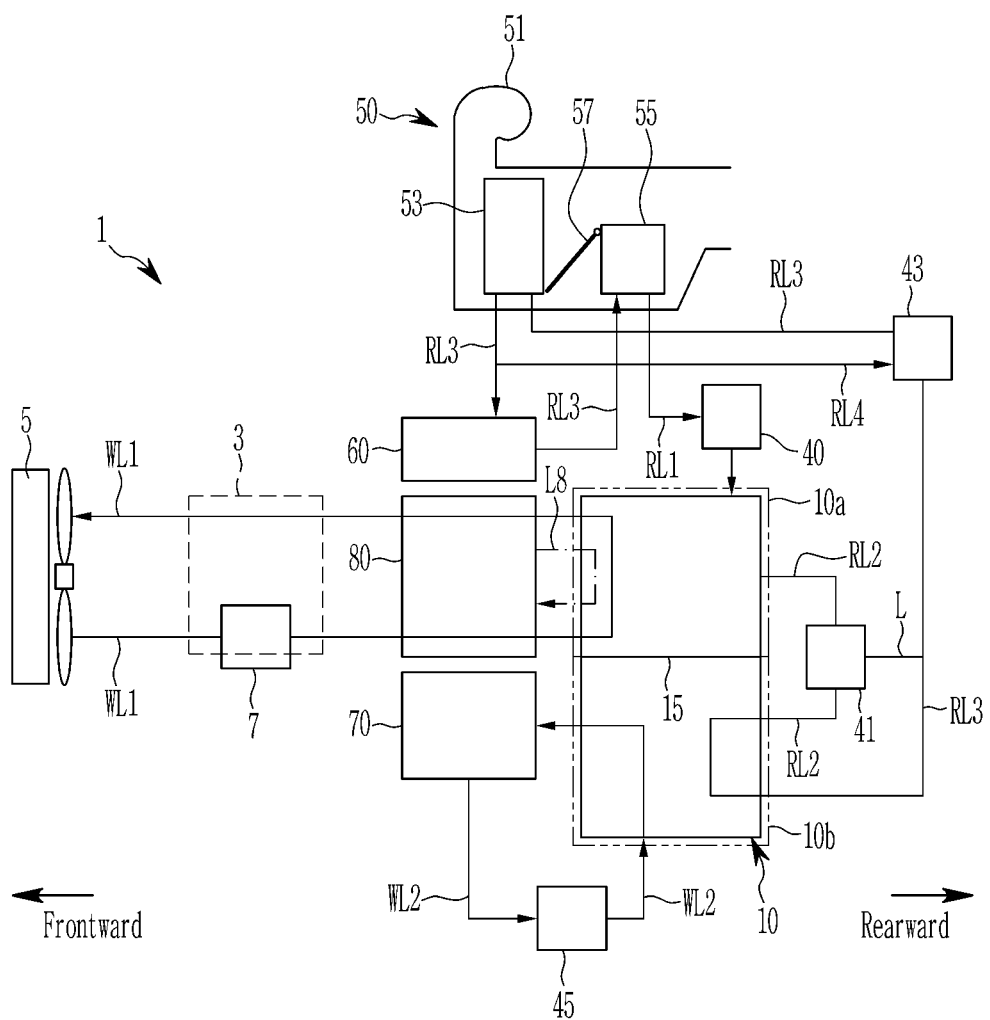
FIG. 1 illustrates a block diagram of a heat exchange system for a vehicle according to one form of the present disclosure.

FIG. 1 illustrates a block diagram of a heat exchange system for a vehicle according to one form of the present disclosure.

Referring to FIG. 1, a heat exchange system 1 for a vehicle according to one form of the present disclosure may be applied to an electric vehicle provided with an autonomous driving controller 70.

Hereinafter, based on FIG. 1, a front side refers to an engine compartment side of the vehicle, and a rear side refers to a trunk side of the vehicle.

The electric vehicle is provided with a rear driving motor 80 that generates power for driving and a high voltage battery 3 that supplies a power source to the rear driving motor 80, so that it charges and uses a high voltage battery 3.

Here, the high voltage battery 3 may be provided as a battery pack in which a plurality of battery cells are intensively stacked.

The rear driving motor 80 that generates power by the high voltage battery 3 needs a cooling and heating system to operate in a certain temperature range.

Meanwhile, there is a trend that the autonomous driving controller 70 is applied not only to an electric vehicle but also to a general vehicle.

The autonomous driving controller 70 is a safety control system for improving the safety and convenience of a driver, and is a device that enables automatic driving to a destination without a driver's manipulation.

A vehicle equipped with such an autonomous driving controller 70 is configured to control driving in response to signal information provided through one-to-one wireless communication with a signal transmitter installed on a road.

In this case, since the autonomous driving controller 70 is a fundamental component of vehicle control, it should be provided with a cooling and heating system that operates in a guaranteed temperature range, as in the rear driving motor 80.

The autonomous driving controller 70 and the rear driving motor 80 as described above may be cooled and heated through an HVAC (heating ventilation, and air conditioning) module 50, which is an air conditioning system of the vehicle.

The autonomous driving controller 70 and the rear driving motor 80 applied to one form of the present disclosure are positioned at the rear side of a vehicle on which a rear wheel base (not shown) is disposed based on a longitudinal direction of the vehicle body.

In addition, the HVAC module 50 is positioned at the rear side of the vehicle.

The heat exchange system 1 for the vehicle according to one form of the present disclosure for achieving heat exchange between the autonomous driving controller 70 and the rear driving motor 80 including the vehicle air conditioning system as described above includes a heat exchange module 10, the HVAC module 50, an electric compressor 60, the autonomous driving controller 70, the rear driving motor 80, and switching valves 40, 41, 43.

The heat exchange module 10 may be connected through a first coolant line WL1 to the radiator 5, which is positioned in the front corresponding to the engine compartment of the vehicle.

In this case, a first electronic water pump 7 is installed on the first coolant line WL1.

In addition, the heat exchange module 10 may be connected to the rear driving motor 80 through an oil line L8.

In addition, the heat exchange module 10 may be connected through the autonomous driving controller 70 through a second coolant line WL2.

In this case, a second electronic water pump 73 is installed on the second coolant line WL2 between the heat exchange module 10 and the autonomous driving controller 70.

The heat exchange module 10 may be divided into a first heat exchange region 10a and a second heat exchange region 10b by a diaphragm 15 and respective through-holes, and detailed descriptions thereof will be continued below.

Figure 2:
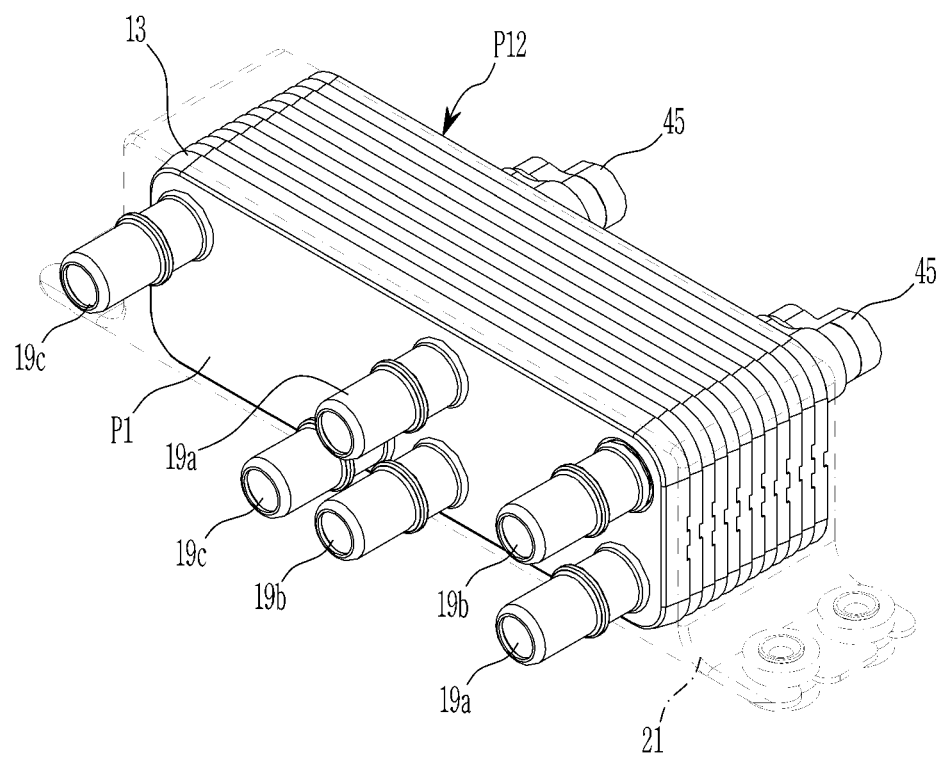
FIG. 2 illustrates a perspective view of a heat exchange module applied to a heat exchange system for a vehicle according to one form of the present disclosure.
Figure 3:
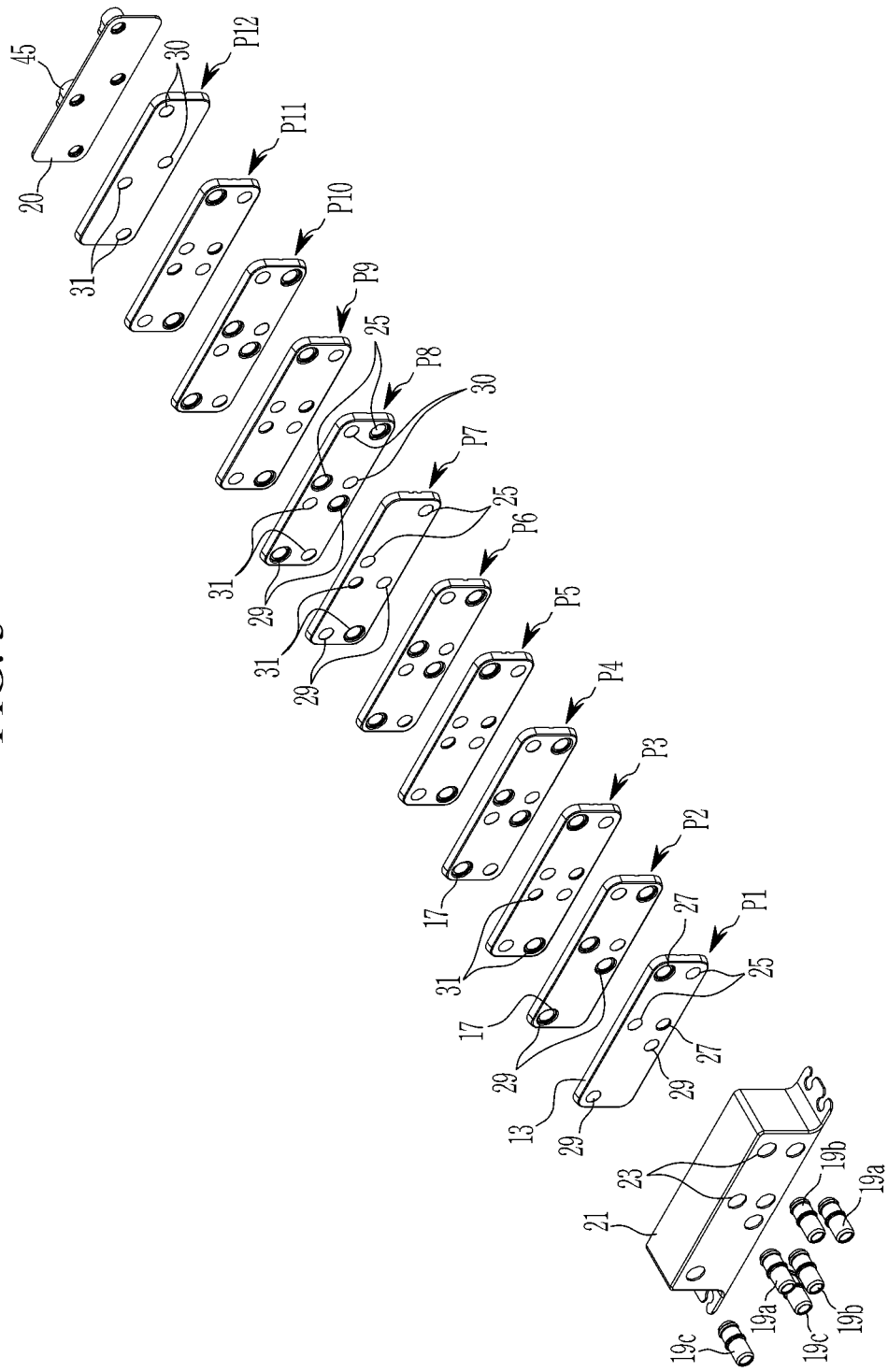
FIG. 3 illustrates an exploded view of a heat exchange module applied to a heat exchange system for a vehicle according to one form of the present disclosure.

FIG. 2 illustrates a perspective view of a heat exchange module applied to a heat exchange system for a vehicle according to one form of the present disclosure, and FIG. 3 illustrates an exploded view of a heat exchange module applied to a heat exchange system for a vehicle according to one form of the present disclosure.

Referring to FIG. 2 and FIG. 3, in the form of the present disclosure, the heat exchange module 10 is disposed in a rear central portion based on the length direction of the vehicle body.

The heat exchange module 10 is formed by overlapping a plurality of plate-shaped plates P1 to P12 having a plurality of through-holes in a predetermined section in a cross-sectional view.

In this case, the heat exchange module 10 is mounted so that the through-holes in each of the plates P1 to P12 are arranged along the length direction of the vehicle body.

In addition, in the heat exchange module 10, the diaphragm 15 is formed in a central portion in a length direction of each of the plates P1 to P12.

The plates P1 to P12 are formed to have a rectangular shape, and a circumference thereof is bent in one direction to form a flange 13.

The plates P1 to P12 are assembled in the same direction so that the respective flanges 13 overlap, and for this purpose, the flange 13 is formed to have a tapered shape that is opened toward the outside.

For example, 12 plates P1 to P12 are overlapped to form the heat exchange module 10, and the number thereof is varied as desired, so that a thickness in a width direction of the heat exchange module 10, that is, a length of a flow passage of a coolant or oil flowing thereinside, may be adjusted.

In addition, each of the plates P1 to P12 is provided with a plurality of through-holes formed at predetermined positions on a cross-section thereof.

In this case, 4 through-holes, which is a minimum number, to 8 through-holes, which is a maximum number, may be formed at a predetermined position for each plate P1 to P12.

In the plates P1 to P12, one at the front side into which a coolant or oil flows is defined as the first plate P1, and one at a rear side into which a refrigerant flows is defined as the twelfth plate P12, and as such, they are defined in order from front to back.

Through holes are formed in the same position in the first plate P1 and the second plate P2.

Specifically, four through-holes are formed in a region corresponding to the first heat exchange region 10a, and two through-holes are formed in a region corresponding to the second heat exchange region 10b, thus a total of 6 through-holes are formed in the first plate P1 and the second plate P2.

In addition, first to third nipples 19a, 19b, 19c into which a first coolant, an oil, and a second coolant are introduced are directly mounted on the first plate P1.

Here, the first coolant may be set to have a relatively higher temperature than that of the second coolant.

Four through-holes formed at a position corresponding to the first heat exchange region 10a on the first plate and the second plate P1 and P2 are formed at respective corners of the first heat exchange region 10a, and they include two first coolant holes 25 through which the first coolant circulates, and two oil holes 27 through which an oil is circulated.

In this case, the first coolant hole 25 and the oil hole 27 are alternately arranged with each other.

In addition, two through-holes formed at a position corresponding to the second heat exchange region 10b on the first plate and the second plate P1 and P2 are formed at respective corner portions facing each other in the second heat exchange region 10b, and they include two second coolant holes 25 through which the second coolant circulates.

In addition, through-holes are formed in the same positions in the third to sixth plates P3 to P6.

Specifically, four through-holes are formed in a region corresponding to the first heat exchange region 10a, and four through-holes are formed in a region corresponding to the second heat exchange region 10b, thus a total of eight through-holes are formed in the third plate P3 to the sixth plate P6.

The four through-holes formed at positions corresponding to the first heat exchange region 10a on the third to sixth plates P3 to P6 are formed at the same positions as the first coolant hole 25 and the oil hole 27 formed in the first and second plates P1 and P2, so that the first coolant and the oil are circulated therethrough, respectively.

In addition, the four through-holes formed at positions corresponding to the second heat exchange region 10b on the third to sixth plates P3 to P6 are formed at the same position as the second coolant hole 29 formed in the first and second plates P1 and P2, and they include two second coolant holes 29 through which the second coolant is circulated and two second refrigerant holes 31 through which the second refrigerant introduced from the side of the twelfth plate P12 to be described below is circulated.

In this case, the two second coolant holes 29 and the two second refrigerant holes 31 are alternately arranged with each other.

In addition, the first coolant hole 25 through which the first coolant passes is formed in the seventh plate P7 at a position corresponding to the first heat exchange region 10a, but the oil hole 27 through which the oil passes is removed, thus the seventh plate is configured to change a direction of oil inflow.

In addition, in the seventh plate P7, the second coolant hole 29 through which the second coolant passes and the second refrigerant hole 31 through which the second refrigerant passes are formed at positions corresponding to the second heat exchange region 10b.

In addition, through-holes are formed in the same positions in the eight to eleventh plates P8 to P11.

Specifically, four through-holes are formed in a region corresponding to the first heat exchange region 10a, and four through-holes are formed in a region corresponding to the second heat exchange region 10b, thus a total of eight through-holes are formed in the eight to eleventh plates P8 to P11.

The four through-holes formed at positions corresponding to the first heat exchange region 10a on the eighth to eleventh plates P8 to P11 are formed at respective corners, and they include two first coolant holes 25 through which the first coolant circulates, and two first refrigerant holes 30 through which a refrigerant introduced from the twelfth plate P12 to be described below circulates.

The refrigerant includes a first refrigerant and a second refrigerant, and it is advantageous that the first refrigerant is set to have a higher temperature and pressure than the second refrigerant.

That is, the first refrigerant includes a high-temperature and high-pressure refrigerant, and the second refrigerant includes a low-temperature and low-pressure refrigerant.

In this case, the first coolant hole 25 and the refrigerant hole 30 are alternately arranged with each other.

The first coolant holes 25 on the eighth to eleventh plates P8 to P11 are connected to the first coolant holes 25 formed in the first to seventh plates P1 to P7, and the first refrigerant hole 30 is at the same position as the oil hole 27 formed in the first to sixth plates P1 to P6, but the oil hole 27 and the first refrigerant hole 30 are mutually blocked by the seventh plate P7.

In addition, the four through-holes formed at positions corresponding to the second heat exchange region 10b on the eighth to eleventh plates P8 to P11 are formed at respective corners of the second heat exchange region 10b, and they include the second refrigerant hole 31 through which the second refrigerant introduced from the side of the twelfth plate P12 circulates, and the second coolant hole 29 through which the second coolant introduced from the side of the first plate P1 circulates.

In addition, the twelfth plate P12 is formed with the first refrigerant hole 30 through which the refrigerant passes at a position corresponding to the first heat exchange region 10a and the second refrigerant hole 31 through which the refrigerant passes at a position corresponding to the second heat exchange region 10b.

In addition, the first coolant hole 25 through which the first coolant passes and the second coolant hole 29 through which the second coolant passes are removed from the twelfth plate P12, and thus the inflow direction of the first coolant and the second coolant may be switched based on the twelfth plate P12.

In addition, seals 17 are alternately mounted in each of the through-holes of the first to twelfth plates P1 to P2 as described above.

For example, the seal 17 is mounted on each first coolant hole 25 formed in the second, fourth, sixth, eighth, and tenth plates P2, P4, P6, P8, and P10.

The seal 17 is mounted on each oil hole 27 formed in the first, third, and fifth plates P1, P3, and P5.

The seal 17 is mounted on each second coolant hole 29 formed in the second, fourth, sixth, eighth, and tenth plates P2, P4, P6, P8, and P10.

The seal 17 is mounted on each first refrigerant hole 30 formed in the ninth and eleventh plates P9 and P11.

Finally, the seal 17 is mounted on each second refrigerant hole 31 formed in the third, fifth, seventh, ninth, and eleventh plate P3, P5, P7, P9, and P11.

The seal 17 may be formed to correspond to a gap between adjacent plates, and respective flow passages may be formed and separated in a specific direction by the seal 17.

In addition, the cover 20 is mounted on the rear of the twelfth plate P12.

Figure 4:
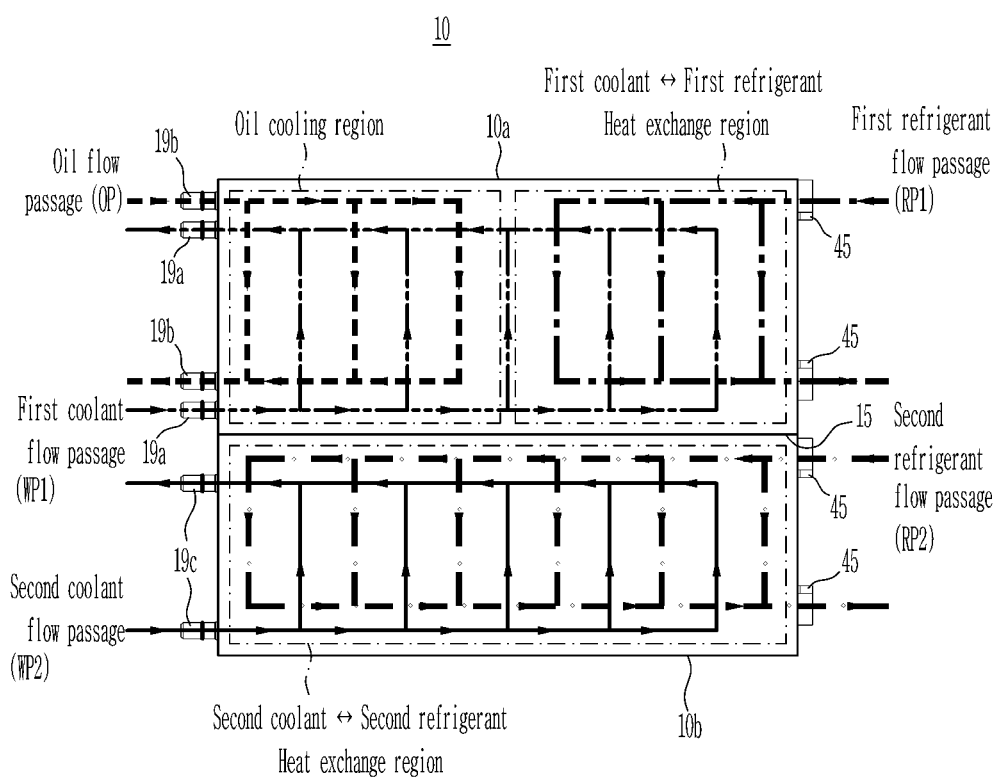
FIG. 4 and FIG. 5 illustrate views for explaining an inner flow passage of a heat-exchange module applied to a heat exchange system for a vehicle according to one form of the present disclosure.
Figure 5:
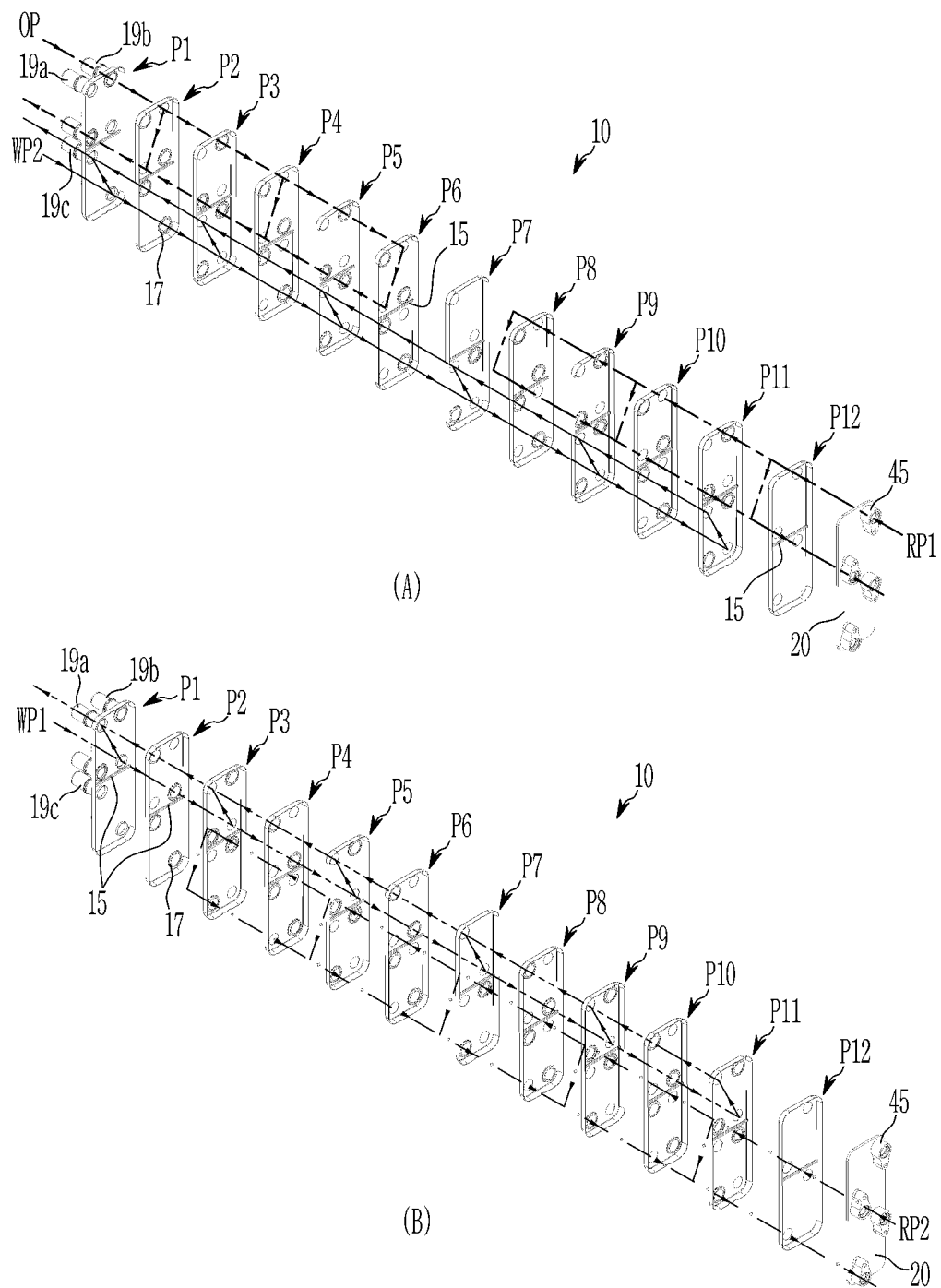

FIG. 4 and FIG. 5 illustrate views for explaining an inner flow passage of a heat-exchange module applied to a heat exchange system for a vehicle according to one form of the present disclosure.

Referring to FIG. 4 and FIG. 5, the heat exchange module 10 has a structure in which a plurality of plates P1 to P12 selectively formed with a plurality of through-holes are overlapped and assembled as described above, and five flow passages are formed therein.

The five flow passages include a first coolant flow passage WP1, a second coolant flow passage WP2, an oil flow passage OP, a first refrigerant flow passage RP1, and a second refrigerant flow passage RP2.

The first coolant flow passage WP1 is a flow passage through which the first coolant flowing from the radiator 5 through the first nipple 19a mounted corresponding to the first heat exchange area 10a on the first plate P1 is circulated.

The first coolant flow passage WP1 has a structure in which the first coolant is introduced from the first plate P1 through the first coolant hole 25 and moves to the eleventh plate P11 and then is direction-switched by the twelfth plate P12 to return to the first plate P1.

In this case, the first coolant is heat-exchanged and cooled by the first refrigerant introduced from the twelfth plate P12 side corresponding to the first heat exchange region 10a.

The oil passage OP is a flow passage through which oil passing through the rear driving motor 80 is circulated through the second nipple 50b mounted corresponding to the first heat exchange region 10a on the first plate P1.

The oil passage OP has a structure in which oil is introduced from the first plate P1 side through the oil hole 27 to move to the sixth plate P6 and then is direction-switched by the seventh plate P7 to return to the first plate P1 side.

In this case, the oil circulating through the oil flow passage OP is heat-exchanged with the cooled first coolant to be cooled.

The second coolant flow passage WP2 is a flow passage through which the second coolant passing through the autonomous driving controller 70 is circulated through the third nipple 19c mounted corresponding to the second heat exchange region 10b on the first plate P1.

The second coolant flow passage WP2 has a structure in which the second coolant is introduced from the first plate P1 through the second coolant hole 29 and moves to the eleventh plate P11 and then is direction-switched by the twelfth plate P12 to return to the first plate P1.

In this case, the second coolant is heat-exchanged and cooled by the second refrigerant introduced from the twelfth plate P12 side corresponding to the second heat exchange region 10b.

In addition, the first refrigerant flow passage RP1 is a flow passage through which the first refrigerant introduced through the valve flange 45 mounted corresponding to the first heat exchange region 10a on the cover 20 is circulated.

The first refrigerant flow passage RP1 has a structure in which the first refrigerant is introduced from the twelfth plate P12 side through the first refrigerant hole 30 to move to the eighth plate P8 and then is direction-switched by the seventh plate P7 to return to the twelfth plate P12 side.

In addition, the second refrigerant flow passage RP2 is a flow passage through which the second refrigerant introduced through the valve flange 45 mounted corresponding to the second heat exchange region 10b on the cover 20 is circulated.

The second refrigerant flow passage RP2 has a structure in which the second refrigerant is introduced from the twelfth plate P12 side through the second refrigerant hole 31 to move to the third plate P3 and then is direction-switched by the second plate P2 to return to the twelfth plate P12 side.

The heat exchange module 10 as described above may be mounted on the vehicle body through a mounting bracket 21 surrounding one side of the outside thereof.

In the mounting bracket 21, a surface at the cover 20 side is opened, and a surface at the nipples 19a, 19b, and 19c side is closed, and it is formed with a mounting hole 23 (see FIG. 3) so that the nipples 19a, 19b, and 19c may be mounted.

In the form of the present disclosure, the HVAC module 50 is disposed at one side in the vehicle width direction with respect to the heat exchange module 10 (see FIG. 1).

For example, it is advantageous that the HVAC module 50 is positioned at the right side of the heat exchange module 10 while being directed to the front of the vehicle.

The HVAC module 50 includes an evaporator 53, an indoor condenser 55, and an opening/closing door 57 inside an air conditioning case 51.

The HVAC module 50 may control the direction of indoor air by operating the opening/closing door 57 according to a cooling mode and a heating mode.

The HVAC module 50 may be disposed at the upper portion of the wheel housing at one side of the rear to be fastened at least two points.

Figure 6:
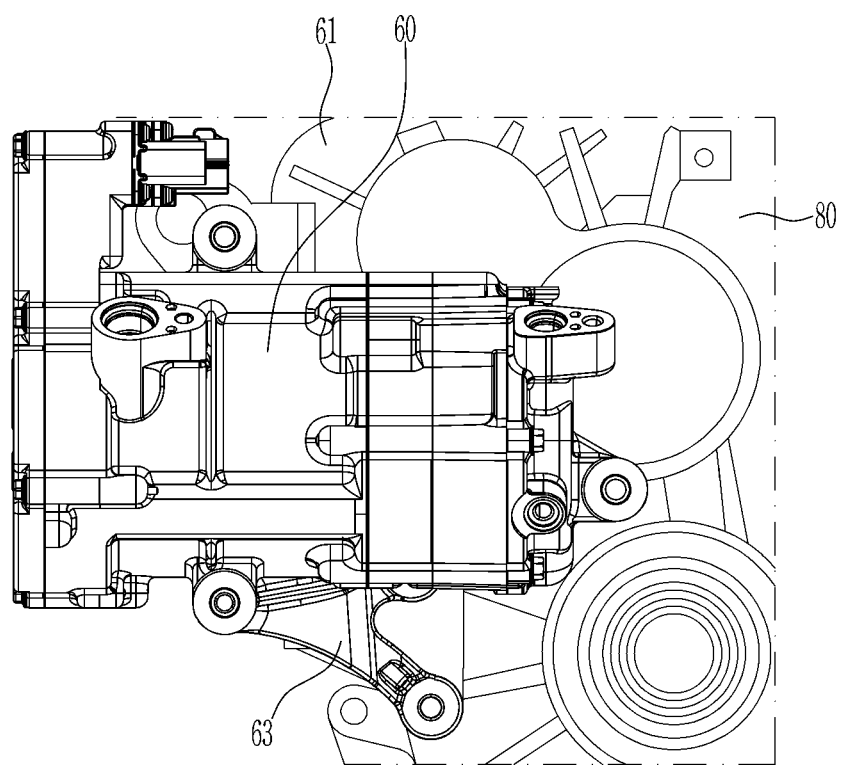
FIG. 6 illustrates a mount view of an electric compressor applied to a heat exchange system for a vehicle according to one form of the present disclosure.

FIG. 6 illustrates a mount view of an electric compressor applied to a heat exchange system for a vehicle according to one form of the present disclosure.

Referring to FIG. 6, in the form of the present disclosure, an electric compressor 60 serves to compress and discharge the refrigerant with the indoor condenser 55 between the heat exchange module 10 and the HVAC module 50.

The electric compressor 60 is connected between the evaporator 53 and the indoor condenser 55 through a third refrigerant line RL3.

That is, the electric compressor 60 serves to compress the refrigerant supplied from the evaporator 53 and then discharge it to the indoor condenser 55.

In addition, the refrigerant condensed from the indoor condenser 55 is supplied to the heat exchange module 10 through the first refrigerant line RL1 to be heat-exchanged with a coolant or oil in the heat exchange module 10.

In addition, the electric compressor 60 is fastened to the housing of the rear driving motor 80 and a reducer 61 positioned adjacent to the rear driving motor 80 at least three points.

In this case, a separate connecting bracket 63 may be applied to the electric compressor 60, and may be fastened to be advantageous for vibration through the connecting bracket 63.

According to this, since the reducer 61 and the rear driving motor 80 are fixed to the mounting parts that primarily absorb the vibration of the vehicle body, when the electric compressor 60 is fixed to the reducer 61 and the rear driving motor 80, it may be advantageous against vehicle vibration.

That is, the vibration primarily absorbed by the reducer 61 and the rear driving motor 80 is transmitted to the electric compressor 60.

Figure 7:
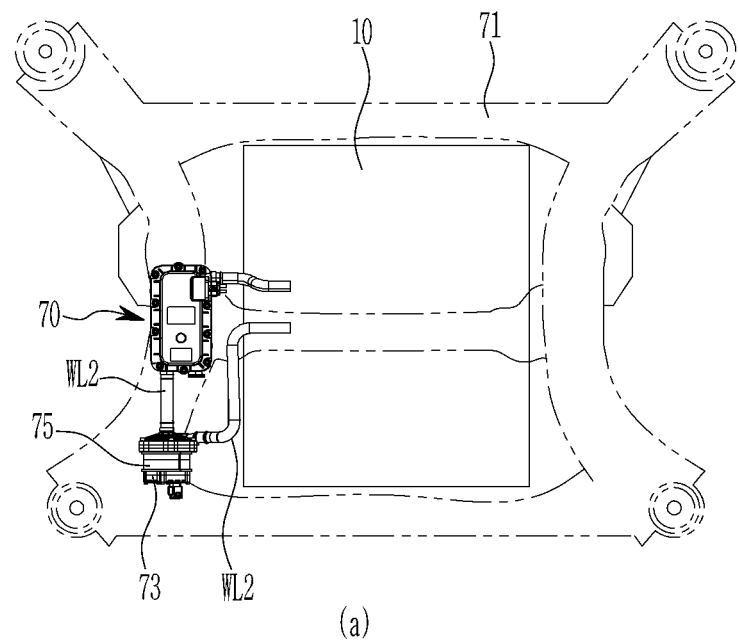
FIG. 7 illustrates a mount view of an autonomous driving controller applied to a heat exchange system for a vehicle according to one form of the present disclosure.
Figure 7:
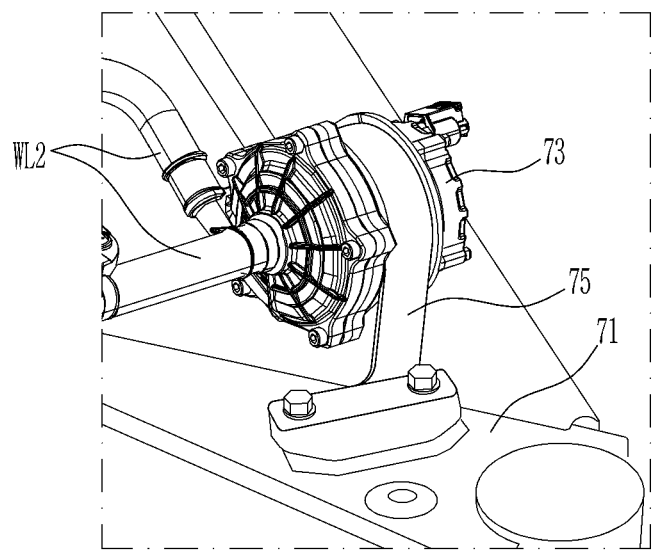

FIG. 7 illustrates a mount view of an autonomous driving controller applied to a heat exchange system for a vehicle according to one form of the present disclosure.

Referring to FIG. 7, in the form of the present disclosure, an autonomous driving controller 70 is disposed at the other side of the vehicle width direction based on the heat exchange module 10.

For example, it is advantageous that the autonomous driving controller 70 is positioned at the left side of the heat exchange module 10 while being directed to the front of the vehicle.

The autonomous driving controller 70 is connected to the heat exchange module 10 through the second coolant line WL2.

The second coolant circulating inside in the autonomous driving controller 70 may be heat-exchanged with the second refrigerant while passing through the second coolant flow passage WP2.

The autonomous driving controller 70 is fastened to at least two points on one side of an upper surface of a rear cross member 71.

In this case, a second electronic water pump 73 is mounted at a position adjacent to the autonomous driving controller 70 on the other side of the upper surface of the rear cross member 71.

In addition, the second electronic water pump 73 may be fastened to at least two points through a fixing bracket 75.

Here, the autonomous driving controller 70 and the second electronic water pump 73 have been described as an example in which they are mounted on the rear cross member 71 of the vehicle, but the present disclosure is not limited thereto, and when they are positioned on a rear left side (LH) of the vehicle and have a mounting structure capable of performing heat exchange between the second coolant and refrigerant, they are applicable.

In the form of the present disclosure, the rear driving motor 80 is disposed at the rear of the vehicle body in the length direction.

The rear driving motor 80 is connected to the heat exchange module 10 through the oil line OL.

The cooling oil circulating inside the rear driving motor 80 may be heat-exchanged with the first coolant while passing through the oil flow passage OP through the oil line OL.

Figure 8:
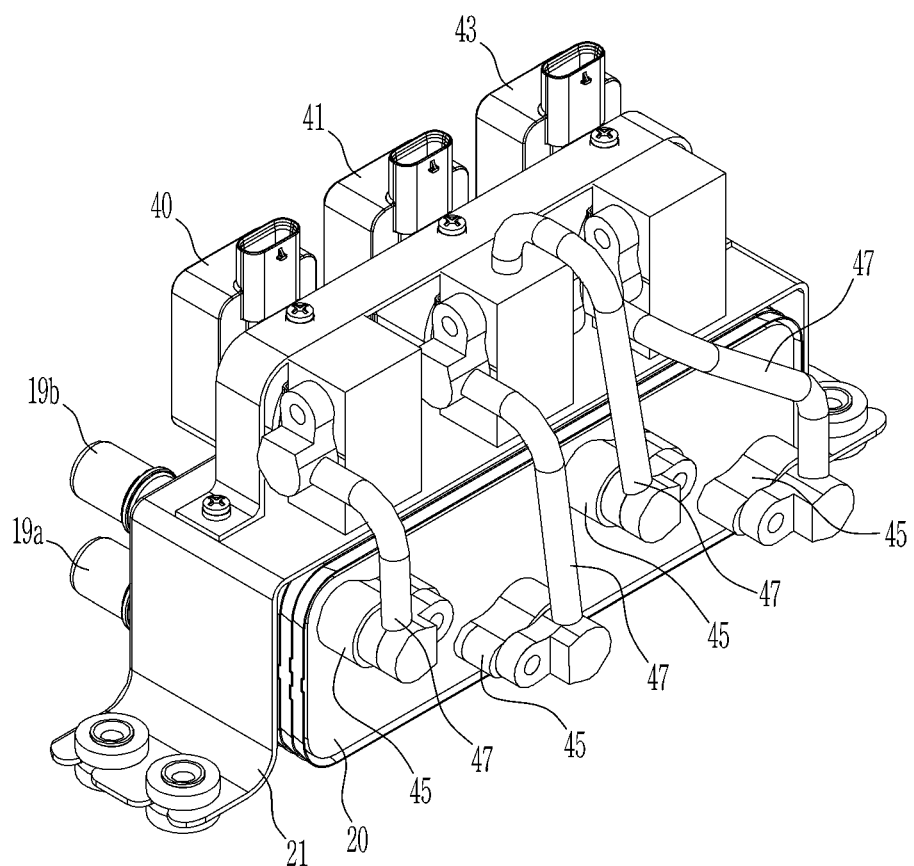
FIG. 8 illustrates a view for explaining a switching valve applied to a heat exchange system for a vehicle according to one form of the present disclosure.

FIG. 8 illustrates a view for explaining a switching valve applied to a heat exchange system for a vehicle according to one form of the present disclosure.

Referring to FIG. 8, in the form of the present disclosure, the switching valve includes the first to third valves 40, 41, 43, and is mounted on one side of the heat exchange module 10.

The first to third valves 40, 41, 43 are connected to the valve flange 45 on the cover 20 through a connecting pipe 47.

Four valve flanges 45 may be formed, and are connected to the first to third valves 40, 41, 43 through the connecting pipe 47.

The first to third valves 40, 41, 43 operate to circulate the first and second refrigerant into the heat exchange module 10.

The first valve 40 is positioned at an upper side of the heat exchange module 10 to be installed on the first refrigerant line RL1 between the indoor condenser 55 and the first heat exchange region 10*a*.

The first valve 40 controls the first refrigerant discharged from the indoor condenser 55 to move into the first heat exchange region 10*a* of the heat exchange module 10.

In this case, the first refrigerant moving through the first valve 40 circulates in the heat exchange module 10*a* along the first refrigerant flow passage RP1.

The first refrigerant flow passage RP1 is connected from the twelfth plate P12 to the eighth plate P8 and is direction-switched in the seventh plate P7 to again return to the twelfth plate P12.

The first refrigerant is for heat-exchange between the oil and the first coolant, and the first valve 40 includes an expansion valve that is a 2-way valve.

In addition, the second valve 41 is disposed on the second refrigerant line RL2 between the first heat exchange region 10*a* and the second heat exchange region 10*b*, and one side thereof is connected to the first refrigerant flow passage RP1 of the first heat exchange region 10*a* through the connecting pipe 47, and the other side thereof is connected to the second refrigerant flow passage RP2 of the second heat exchange region 10*b* through the connecting pipe 47.

The second valve 41 connects the second refrigerant line RL2 and a branch line L branched from the third refrigerant line RP3.

In addition, the second valve 41 is disposed adjacent to the first valve 40.

The second valve 41 may be an expansion valve that is a 3-way valve that interconnects the second refrigerant line RL2 and the branch line L connected to one side of the third refrigerant line RL3 to circulate the second refrigerant.

In addition, the third valve 43 interconnects the third refrigerant line RL3 between the second heat exchange region 10*b* and the electric compressor 60 and the fourth refrigerant line RL4 that is branched from the third refrigerant line RL3 to be connected to the evaporator 53.

In addition, the third valve 43 is disposed adjacent to the second valve 41.

In this case, the second refrigerant moving through the third valve 43 circulates through the second refrigerant flow passage RP2 of the heat exchange module 10, wherein the second refrigerant flow passage RP2 is connected from the twelfth plate P12 to the third plate P3 and is direction-switched through the second plate P2 to again return to the twelfth plate P12.

The third valve 43 may be an expansion valve that is a 3-way valve selectively circulating the refrigerant into the third refrigerant line RL3 and the fourth refrigerant line RL4.

Hereinafter, an operation of a heat exchange system for a vehicle for each mode of the vehicle will be described.

FIG. 9 to FIG. 15 illustrate views for explaining operations of respective modes of a heat exchange system for a vehicle according to one form of the present disclosure.

Hereinafter, for better understanding of the description, the first refrigerant will be expressed as a high-temperature and high-pressure refrigerant, and the second refrigerant will be expressed as a low-temperature and low-pressure refrigerant.

Figure 9:
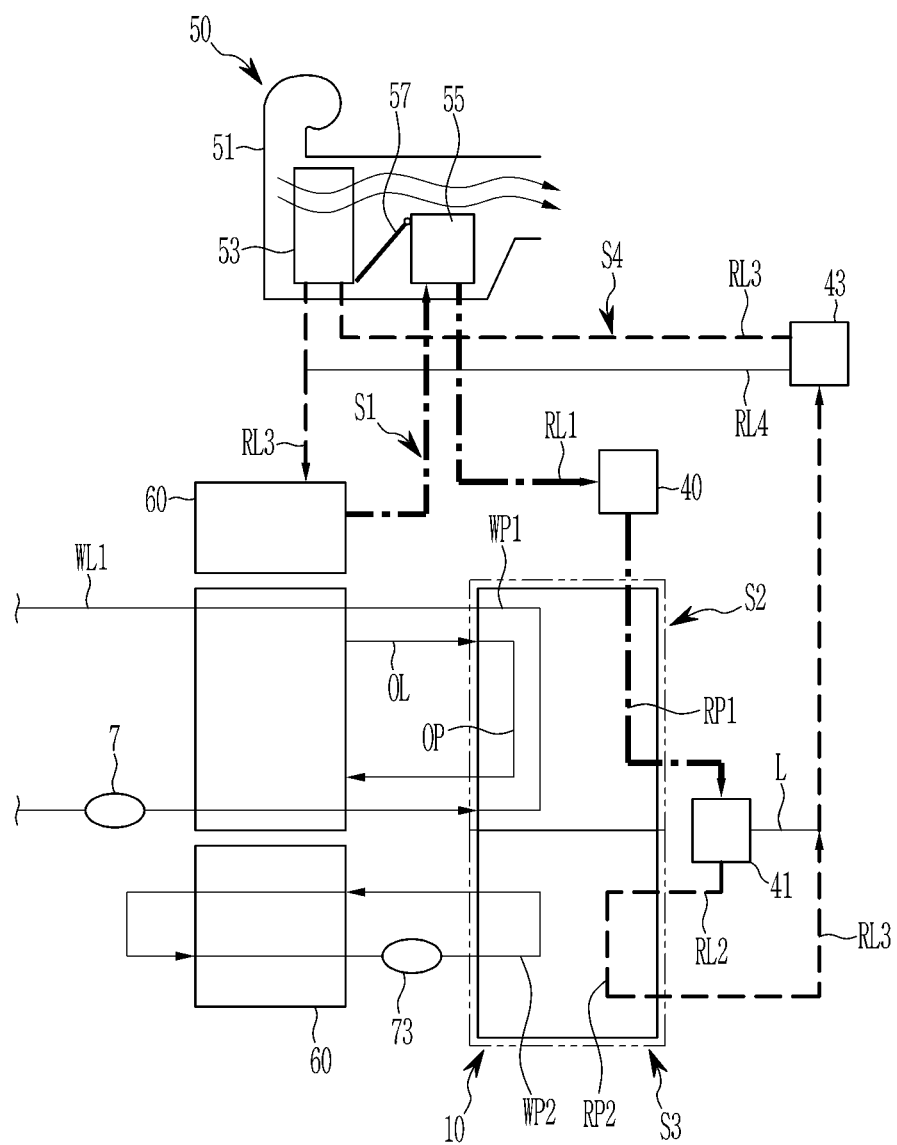
FIG. 9 illustrates a view for explaining operation of a heat exchange system for a vehicle according to one form of the present disclosure when cooling the autonomous driving controller in the cooling mode of the vehicle.

FIG. 9 illustrates a case of cooling the autonomous driving controller 70 in the cooling mode of the vehicle.

The high-temperature and high-pressure refrigerant is circulated from the electric compressor 60 to the indoor condenser 55 (S1).

The first valve 40 is opened, and the high-temperature and high-pressure refrigerant is circulated to the first heat exchange region 10a to be heat-exchanged with the first coolant and the oil (S2).

The second valve 41 expands the refrigerant to form the high-temperature and high-pressure refrigerant into the low-temperature and low-pressure refrigerant.

In this case, the second valve 41 closes the branch line L and opens a passage of the second heat exchange region 10b side to circulate the low-temperature and low-pressure refrigerant to the second heat exchange region 10b through the second refrigerant line RL2 to be heat-exchanged with the second coolant (S3).

The third valve 43 closes the fourth refrigerant line RL4.

It opens the third refrigerant line RL3 and circulates the low-temperature and low-pressure refrigerant to the evaporator 53 (S4).

Meanwhile, the opening/closing door 57 opens the evaporator 53 side.

As described above, while cooling the autonomous driving controller 70 through heat exchange with the second coolant, the cooling mode may be provided by supplying cold air to the interior of the vehicle by the low-temperature and low-pressure refrigerant introduced through the third refrigerant line RL3 and the operation of the opening/closing door 57.

Figure 10:
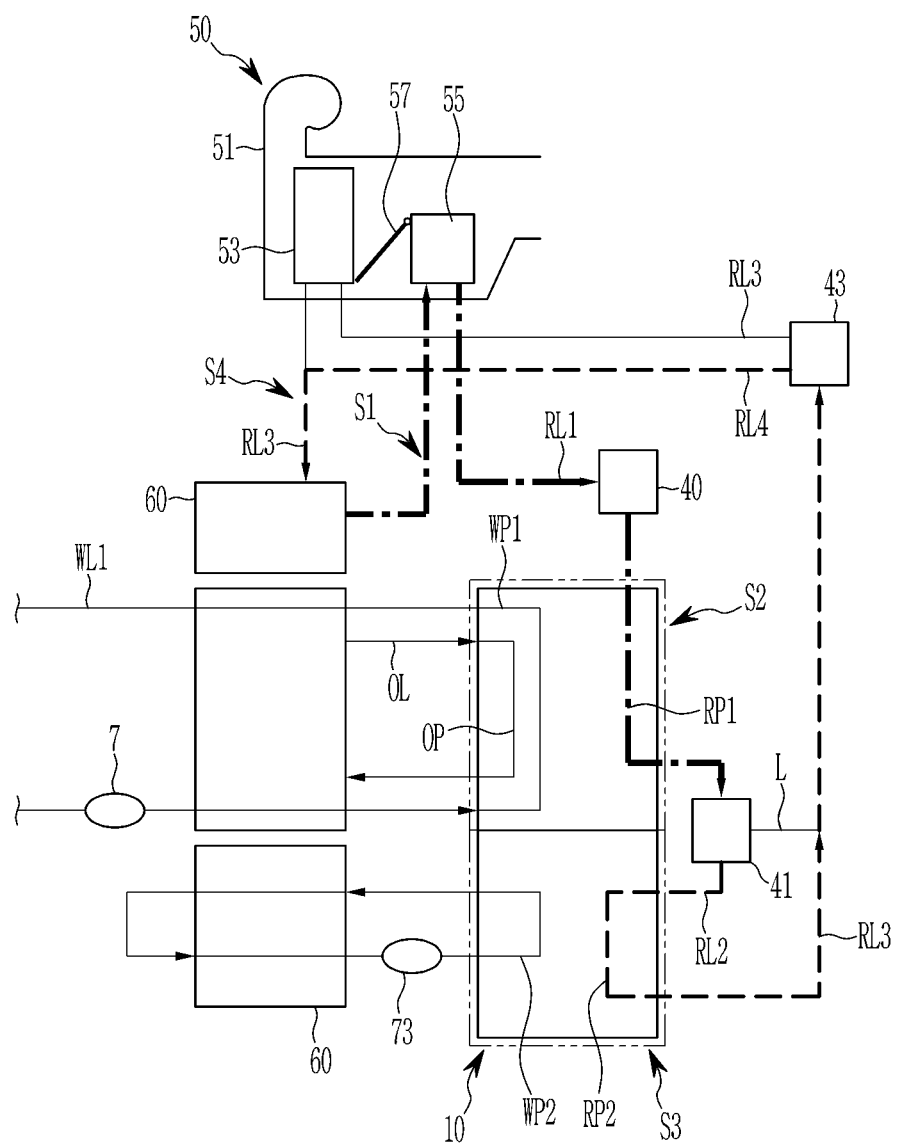
FIG. 10 illustrates a view for explaining operation of a heat exchange system for a vehicle according to one form of the present disclosure when cooling the autonomous driving controller in a cooling mode off and a heating mode off state of the vehicle.

FIG. 10 illustrates a case of cooling the autonomous driving controller 70 in a cooling mode off and a heating mode off state of the vehicle.

The high-temperature and high-pressure refrigerant is circulated from the electric compressor 60 to the indoor condenser 55.

The first valve 40 is opened, and the high-temperature and high-pressure refrigerant is circulated to the first heat exchange region 10a to be heat-exchanged with the first coolant and the oil (S2).

The second valve 41 expands the refrigerant to form the high-temperature and high-pressure refrigerant into the low-temperature and low-pressure refrigerant.

It closes the branch line L and opens a passage of the second heat exchange region 10b side to circulate the low-temperature and low-pressure refrigerant to the second heat exchange region 10b to heat-exchange with the second coolant (S3).

The third valve 43 closes the third refrigerant line RL3 and opens the fourth refrigerant line RL4.

In this case, the low-temperature and low-pressure refrigerant is circulated to the electric compressor 60.

Meanwhile, the opening/closing door 57 blocks the indoor condenser 55 side so that hot air does not flow into the vehicle interior.

As described above, the third refrigerant line RL3 may be closed to cool the autonomous driving controller 70 through heat exchange with the second coolant regardless of the cooling mode or the heating mode.

Figure 11:
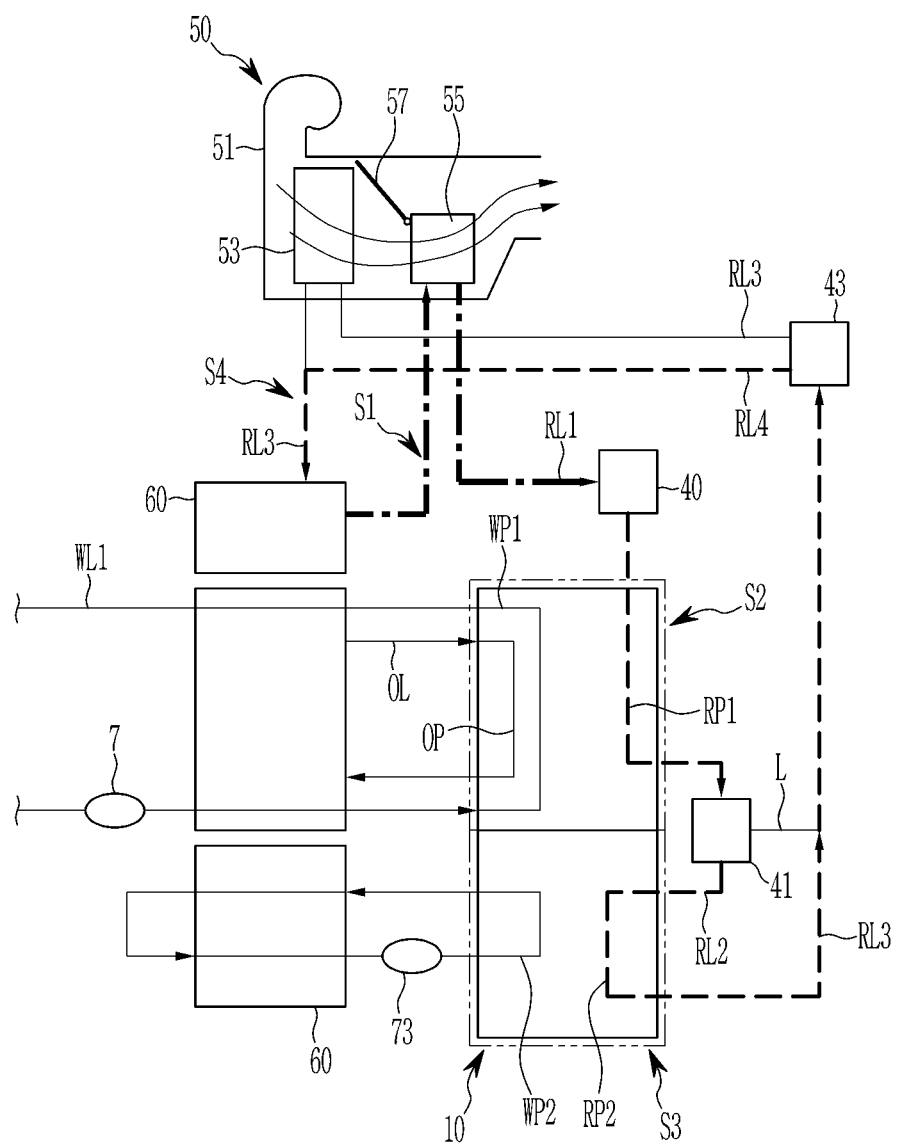
FIG. 11 illustrates a view for explaining operation of a heat exchange system for a vehicle according to one form of the present disclosure when cooling the autonomous driving controller in the heating mode of the vehicle.

FIG. 11 illustrates a case of cooling the autonomous driving controller 70 in the heating mode of the vehicle.

The high-temperature and high-pressure refrigerant is circulated from the electric compressor 60 to the indoor condenser 55 (S1).

The first valve 40 expands the refrigerant to form the high-temperature and high-pressure refrigerant into the low-temperature and low-pressure refrigerant.

The low-temperature and low-pressure refrigerant is circulated to the first heat exchange region 10a, and heat exchange with the first coolant and the oil is performed (S2).

The second valve 41 closes the branch line L and opens the passage of the second heat exchange region 10b side.

The low-temperature and low-pressure refrigerant is circulated to the second heat exchange region 10b, and heat exchange with the second coolant is performed (S3).

The third valve 43 closes the third refrigerant line RL3 and opens the fourth refrigerant line RL4 to circulate the low-temperature and low-pressure refrigerant to the electric compressor 60 (S4).

Meanwhile, the opening/closing door 57 opens the indoor condenser 55 side.

As described above, it is possible to provide the heating mode by cooling the autonomous driving controller 70 through heat exchange with the second coolant and supplying hot air to the interior of the vehicle by the operation of the opening/closing door 57.

Figure 12:
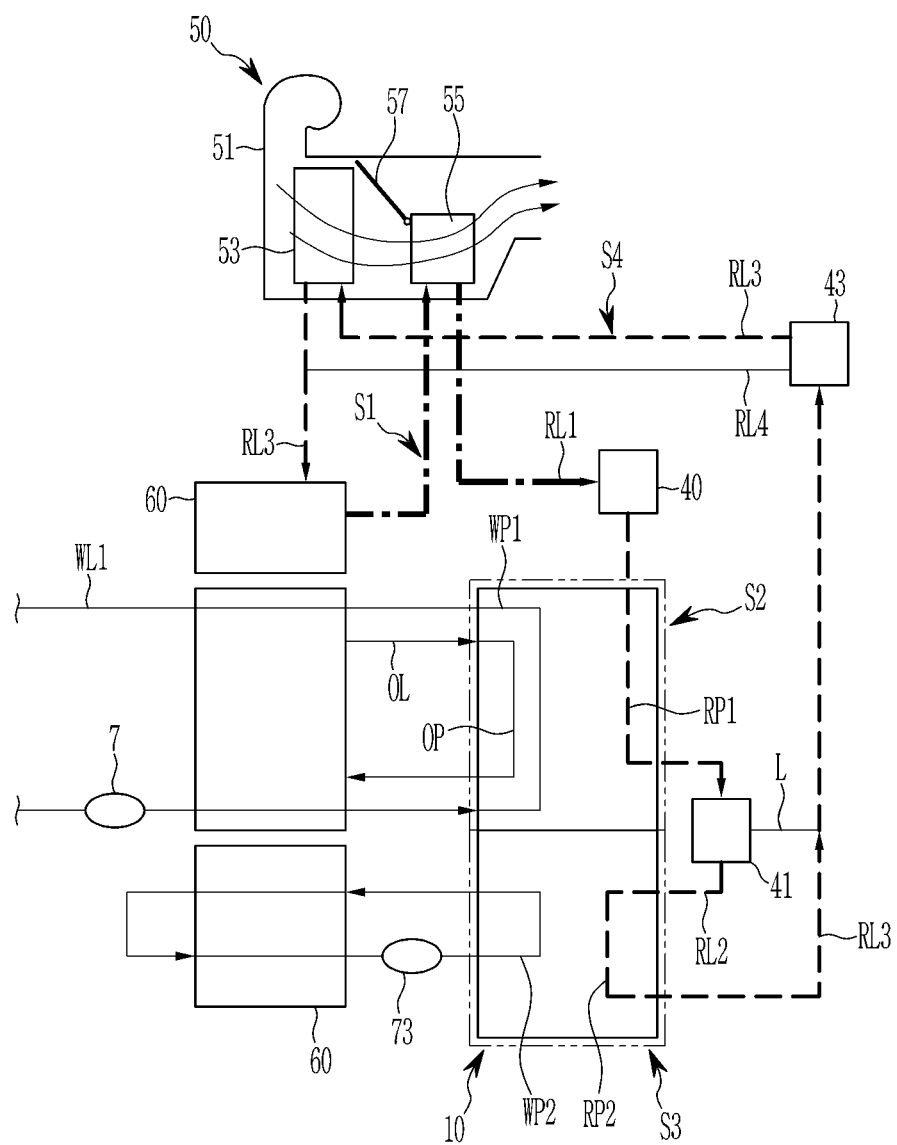
FIG. 12 illustrates a view for explaining operation of a heat exchange system for a vehicle according to one form of the present disclosure when cooling the autonomous driving controller in the heating mode and the dehumidifying mode of the vehicle.

FIG. 12 illustrates a case of cooling the autonomous driving controller 70 in the heating mode and the dehumidifying mode of the vehicle.

The high-temperature and high-pressure refrigerant is circulated from the electric compressor 60 to the indoor condenser 55 (S1).

The first valve 40 expands the refrigerant to form the high-temperature and high-pressure refrigerant into the low-temperature and low-pressure refrigerant.

The low-temperature and low-pressure refrigerant is circulated to the first heat exchange region 10a, and heat exchange with the first coolant and the oil is performed (S2).

The second valve 41 opens the passage of the second heat exchange region 10b side.

The low-temperature and low-pressure refrigerant is circulated to the second heat exchange region 10b, and heat exchange with the second coolant is performed.

The third valve 43 closes the fourth refrigerant line RL4 and opens the third refrigerant line RL3 to circulate the low-temperature and low-pressure refrigerant to the evaporator 53 (S4).

The low-temperature and low-pressure refrigerant may be circulated in the evaporator 53 to perform the operation of the dehumidifying mode.

Meanwhile, the opening/closing door 57 opens the indoor condenser 55 side.

As described above, while cooling the autonomous driving controller 70 through the heat exchange with the second coolant, the outside air passes through the low-temperature and low-pressure refrigerant in the evaporator 53 and then passes the high-temperature and high-pressure refrigerant in the indoor condenser 55 to be supplied to the interior of the vehicle, thereby providing the heating mode and the dehumidifying mode.

Figure 13:
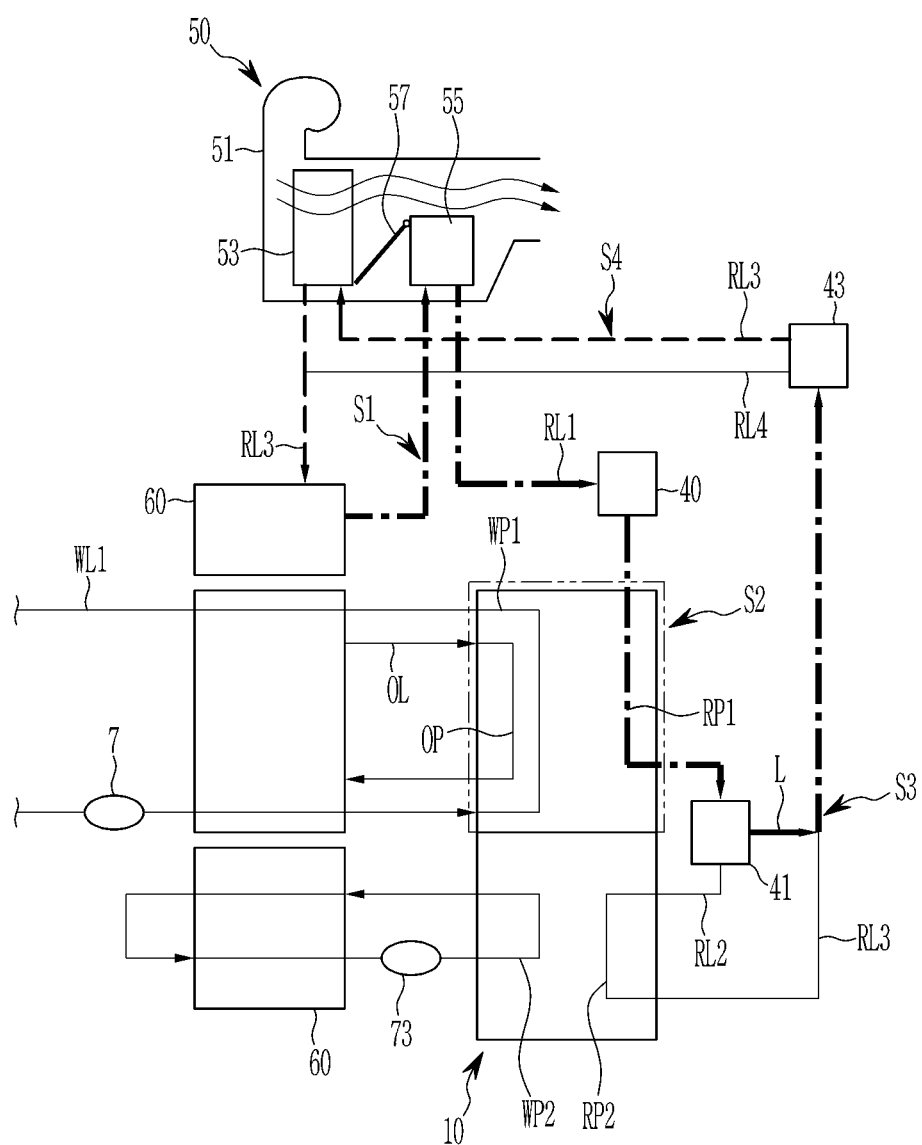
FIG. 13 illustrates a view for explaining operation of a heat exchange system for a vehicle according to one form of the present disclosure when not cooling the autonomous driving controller in the cooling mode of the vehicle.

FIG. 13 illustrates a case of not cooling the autonomous driving controller 70 in the cooling mode of the vehicle.

The high-temperature and high-pressure refrigerant is circulated from the electric compressor 60 to the indoor condenser 55 (S1).

The first valve 40 is opened, and the high-temperature and high-pressure refrigerant is circulated to the first heat exchange region 10*a* to be heat-exchanged with the first coolant and the oil (S2).

The second valve 41 closes the passage of the second heat exchange region 10*b* side and opens the branch line L (S3).

The high-temperature and high-pressure refrigerant is circulated to a third refrigerant line RL3 through the branch line L.

The third valve 43 expands the refrigerant to form the high-temperature and high-pressure refrigerant into the low-temperature and low-pressure refrigerant.

The third valve 43 closes the fourth refrigerant line RL4 and opens the third refrigerant line RL3 to circulate the low-temperature and low-pressure refrigerant to the evaporator 53 (S4).

Meanwhile, the opening/closing door 57 opens the evaporator 53 side.

As described above, the cooling mode may be provided by supplying cold air to the interior of the vehicle without heat exchange of the autonomous driving controller 70.

FIG. 14 illustrates a mode of not cooling the autonomous driving controller 70 in the heating mode of the vehicle.

The high-temperature and high-pressure refrigerant is circulated from the electric compressor 60 to the indoor condenser 55 (S1).

The first valve 40 expands the refrigerant to form the high-temperature and high-pressure refrigerant into the low-temperature and low-pressure refrigerant.

The low-temperature and low-pressure refrigerant is circulated to the first heat exchange region 10*a*, and heat exchange with the first coolant and the oil is performed (S2).

The second valve 41 closes the passage of the second heat exchange region 10*b* side and opens the branch line L (S3).

The low-temperature and low-pressure refrigerant is circulated to the third refrigerant line RL3 through the branch line L.

The third valve 43 closes the third refrigerant line RL3 of the evaporator 53 side and opens the fourth refrigerant line RL4 to circulate the low-temperature and low-pressure refrigerant to the electric compressor 60 (S4).

Meanwhile, the opening/closing door 57 opens the indoor condenser 55 side.

As described above, the heating mode may be realized by supplying hot air to the interior of the vehicle without heat exchange of the autonomous driving controller 70.

FIG. 15 illustrates a mode of not cooling the autonomous driving controller 70 in the heating and the dehumidifying mode of the vehicle.

The high-temperature and high-pressure refrigerant is circulated from the electric compressor 60 to the indoor condenser 55 (S1).

The first valve 40 allows the refrigerant to expand to form the high-temperature and high-pressure refrigerant into the low-temperature and low-pressure refrigerant.

The low-temperature and low-pressure refrigerant is circulated to the first heat exchange region 10*a*, and heat exchange with the first coolant and the oil is performed.

The second valve 41 closes the passage of the second heat exchange region 10*b* side and opens the branch line L (S3).

The low-temperature and low-pressure refrigerant is circulated to the third refrigerant line RL3 through the branch line L.

The third valve 43 closes the fourth refrigerant line RL4 and opens the third refrigerant line RL3 to circulate the low-temperature and low-pressure refrigerant to the evaporator 53 (S4).

Meanwhile, the opening/closing door 57 opens the indoor condenser 55 side.

As described above, after passing through the low-temperature and low-pressure refrigerant in the evaporator 53, the outside air passes through the indoor condenser 55 and is supplied to the interior of the vehicle, and thus, without heat exchange of the autonomous driving controller 70, the heating mode and the dehumidifying mode may be provided.

Accordingly, the heat exchange system for the vehicle according to one form of the present disclosure may reduce a package space by performing heat exchange between the HVAC module, the electric compressor, the rear driving motor, and the autonomous driving controller through one heat exchange module.

In other words, the heat exchange system for the vehicle may reduce the package space by heat-exchanging four types of fluids with one heat exchange module.

In addition, it is possible to provide heat exchange of cooling oil, which is essential for an oil-cooled driving motor developed in accordance with high performance of a driving motor applied to an electric vehicle, through the heat exchange module.

In addition, the heat exchange system for the vehicle according to one form of the present disclosure may implement an independent refrigerant circuit by arranging all of the heat exchange module, the HVAC module, the electric compressor, the autonomous driving controller, the rear driving motor, and the switching valve, in the rear of the vehicle.

In addition, according to the heat exchange system for the vehicle of one form of the present disclosure, as the heat exchange module and the switching valve are modularized, the installation space may be reduced and the in-line working man-hours may be reduced.

In addition, according to the heat exchange system for the vehicle of one form of the present disclosure, it is possible to improve fuel economy as heat exchange of the autonomous driving controller may be independently controlled for each of the cooling mode, the heating mode, and the dehumidifying mode of the vehicle.

While this disclosure has been described in connection with what is presently considered to be practical forms, it is to be understood that the disclosure is not limited to the disclosed forms, but, on the contrary, is intended to cover various modifications and equivalent arrangements included within the spirit and scope of the present disclosure.

| <Description of symbols> | |
|---|---|
| 1: heat exchange system | 3: high voltage battery |
| 5: radiator | 7: first electronic water pump |
| 10: heat exchange module | 10a: first heat exchange region |
| 10b: second heat exchange region | 13: flange |
| 15: diaphragm | 17: seal |
| 19: nipple | 20: cover |
| 21: mounting bracket | 23: mounting hole |
| 25: first coolant hole | 27: oil hole |
| 29: second coolant hole | 30: first refrigerant hole |
| 31: second refrigerant hole | 40: first valve |
| 41: second valve | 43: third valve |
| 45: valve flange | 47: connecting pipe |
| 50: HVAC module | 51: air conditioning case |
| 53: evaporator | 55: indoor condenser |

<Description of symbols>

| | |
|---|---|
| 57: opening/closing door | 60: electric compressor |
| 61: reducer | 63: connecting bracket |
| 65: mounting part | 70: autonomous driving controller |
| 71: rear cross member | 73: second electronic water pump |
| 75: fixing bracket | 80: rear driving motor |
| WL1: first coolant line | WL2: second coolant line |
| RL1: first refrigerant line | RL2: second refrigerant line |
| RL3: third refrigerant line | RL4: fourth refrigerant line |
| OL: oil line | L: branch line |
| WP1: first coolant flow passage | |
| WP2: second coolant flow passage | |
| OP: oil flow passage | |
| RP1: first refrigerant flow passage | |
| RP2: second refrigerant flow passage | |

What is claimed is:

1. A heat exchange system for a vehicle, the heat exchange system comprising:
   a heat exchange module disposed at a rear, in a length direction, of a vehicle body, formed of a plurality of plates overlapped to each other, each plate of the plurality of plates including a plurality of through-holes in a predetermined section in a cross-sectional view, and including a first heat exchange region and a second heat exchange region, the first heat exchange region including a first coolant flow passage, an oil flow passage, and a first refrigerant flow passage, and a second heat exchange region including a second coolant flow passage and a second refrigerant flow passage;
   a radiator installed at a front, in the length direction, of the vehicle body, and configured to allow heat exchange while a first coolant circulating therein passes through the first coolant flow passage;
   a heating, ventilation, and air conditioning (HVAC) module disposed at the rear, including an air conditioning case that includes an evaporator, an indoor condenser, and an opening/closing door provided therein, and configured to operate the opening/closing door according to a cooling mode and a heating mode and to control a direction of indoor air;
   an electric compressor configured to discharge a first refrigerant to the indoor condenser between the heat exchange module and the HVAC module;
   a rear driving motor disposed at the rear, and configured to exchange heat with the first coolant while a cooling oil circulating therein passes through the oil flow passage;
   an autonomous driving controller disposed at the rear, and configured to allow heat exchange between the first refrigerant and a second coolant while the second coolant circulating therein passes through the second coolant flow passage; and
   a switching valve including:
      a first valve installed on a first refrigerant line between the indoor condenser and the first heat exchange region;
      a second valve installed on a second refrigerant line between the first heat exchange region and the second heat exchange region, and configured to connect a branch line branched from the second refrigerant line; and
      a third valve installed on a third refrigerant line that is connected to an electric compressor via the second heat exchange region and the indoor condenser, and configured to be connected to a fourth refrigerant line that branched from the third refrigerant line.

2. The heat exchange system for the vehicle of claim 1, wherein the heat exchange module includes the plurality of through-holes formed on each plate of the plurality of plates along the length direction of the vehicle body, and is mounted on an upper surface of the rear driving motor through a mounting bracket.

3. The heat exchange system for the vehicle of claim 1, wherein the heat exchange module comprises:
   a flange formed along a circumference of each plate of the plurality of plates; and
   a diaphragm formed at a center portion in a length direction of each plate of the plurality of plates and configured to divide the first heat exchange region and the second heat exchange region.

4. The heat exchange system for the vehicle of claim 1, wherein the first heat exchange region is configured in a structure in which:
   the first coolant is circulated through a first coolant line connecting the radiator and the first coolant flow passage;
   the cooling oil is circulated through an oil line connecting the rear driving motor and the oil flow passage; and
   the first refrigerant is circulated through the first refrigerant line, and heat exchange of the first coolant and the cooling oil is performed through the first refrigerant.

5. The heat exchange system for the vehicle of claim 1, wherein the second heat exchange region is configured in a structure in which:
   the second coolant is circulated through a second coolant line connecting the autonomous driving controller and the second coolant flow passage;
   the first refrigerant flows in from the second refrigerant line and is circulated through the third refrigerant line and the fourth refrigerant line, and heat exchange of the second coolant is performed through the first refrigerant.

6. The heat exchange system for the vehicle of claim 1, wherein the first valve is an expansion valve disposed at an upper side of the heat exchange module and is configured to circulate the first refrigerant discharged from the indoor condenser into the first refrigerant flow passage.

7. The heat exchange system for the vehicle of claim 6, wherein the second valve is an expansion valve disposed adjacent to the first valve and is configured to interconnect a branch line, which is connected to a first side of the third refrigerant line, and the second refrigerant line.

8. The heat exchange system for the vehicle of claim 7, wherein the third valve is an expansion valve disposed adjacent to the second valve and is configured to selectively circulate the first refrigerant through the third refrigerant line and the fourth refrigerant line.

9. The heat exchange system for the vehicle of claim 8, wherein when cooling the autonomous driving controller in the cooling mode of the vehicle:
   a first refrigerant is circulated to the indoor condenser from the electric compressor;
   the first valve is opened, circulates the first refrigerant to the first heat exchange region, and allows heat exchange of the first coolant;
   the second valve expands and forms the first refrigerant into a second refrigerant that is relatively cooler than the first refrigerant, closes the branch line, opens a passage of a second heat exchange region side, and circulates the second refrigerant to the second heat exchange region and allows heat exchange of the second coolant; and the third valve closes the fourth refrigerant line, and opens the third refrigerant line and allows the second refrigerant to circulate to the evaporator.

10. The heat exchange system for the vehicle of claim 8, wherein when cooling the autonomous driving controller in a cooling mode off-state and a heating mode off-state of the vehicle:

a first refrigerant is circulated to the indoor condenser from the electric compressor;

the first valve is opened, circulates the first refrigerant to the first heat exchange region, and allows heat exchange of the first coolant;

the second valve expands and forms the first refrigerant into a second refrigerant that is relatively cooler than the first refrigerant, closes the branch line, opens a passage of a second heat exchange region side, and circulates the second refrigerant to the second heat exchange region and allows heat exchange of the second coolant; and the third valve closes the third refrigerant line and opens the fourth refrigerant line, and circulates the second refrigerant to the electric compressor.

11. The heat exchange system for the vehicle of claim 8, wherein when cooling the autonomous driving controller in the heating mode of the vehicle:

the first refrigerant is circulated to the indoor condenser from the electric compressor;

the first valve expands and forms the first refrigerant into a second refrigerant that is relatively cooler than the first refrigerant, and circulates the second refrigerant to the first heat exchange region and allows heat exchange of the first coolant;

the second valve opens a passage of a second heat exchange region side and circulates the second refrigerant to the second heat exchange region and allows heat exchange of the second coolant; and the third valve closes the third refrigerant line and opens the fourth refrigerant line, and allows the second refrigerant to circulate to the electric compressor.

12. The heat exchange system for the vehicle of claim 8, wherein when cooling the autonomous driving controller in the heating mode and a dehumidifying mode of the vehicle, the first refrigerant is circulated to the indoor condenser from the electric compressor;

the first valve expands and forms the first refrigerant into a second refrigerant that is relatively cooler than the first refrigerant, circulates the second refrigerant to the first heat exchange region, and allows heat exchange of the first coolant;

the second valve opens a passage of a second heat exchange region side, circulates the second refrigerant to the second heat exchange region, and allows heat exchange of the second coolant; and the third valve closes the fourth refrigerant line, opens the third refrigerant line, and circulates the second refrigerant to the evaporator.

13. The heat exchange system for the vehicle of claim 8, wherein when not cooling the autonomous driving controller in a cooling mode of the vehicle:

the first refrigerant is circulated to the indoor condenser from the electric compressor;

the first valve is opened, circulates the first refrigerant to the first heat exchange region, and allows heat exchange of the first coolant;

the second valve closes a passage of a second heat exchange region side, opens the branch line, and circulates the first refrigerant to the third refrigerant line through the branch line; and the third valve expands and forms the first refrigerant into a second refrigerant that is relatively cooler than the first refrigerant, and closes the fourth refrigerant line, opens the third refrigerant line, and circulates the second refrigerant to the evaporator.

14. The heat exchange system for the vehicle of claim 8, wherein when not cooling the autonomous driving controller in the heating mode of the vehicle:

the first refrigerant is circulated to the indoor condenser from the electric compressor;

the first valve expands and forms the first refrigerant into a second refrigerant that is relatively cooler than the first refrigerant, circulates the second refrigerant to the first heat exchange region, and allows heat exchange of the first coolant;

the second valve closes a passage of a second heat exchange region side, opens the branch line, and circulates the second refrigerant to the third refrigerant line through the branch line; and the third valve closes the third refrigerant line of an evaporator side, opens the fourth refrigerant line, and circulates the second refrigerant to the electric compressor.

15. The heat exchange system for the vehicle of claim 8, wherein when not cooling the autonomous driving controller in the heating mode and a dehumidifying mode of the vehicle, the first refrigerant is circulated to the indoor condenser from the electric compressor;

the first valve expands the first refrigerant and forms a second refrigerant that is relatively cooler than the first refrigerant, and circulates the second refrigerant to the first heat exchange region and allows heat exchange of the first coolant;

the second valve closes a passage of a second heat exchange region side, opens the branch line, and circulates the second refrigerant to the third refrigerant line through the branch line; and the third valve closes the fourth refrigerant line, opens the third refrigerant line, and circulates the second refrigerant to the evaporator.

16. The heat exchange system for the vehicle of claim 1, further comprising a connecting bracket that absorbs vibrations of a vehicle body, wherein the electric compressor is fastened to at least two points on a housing of the rear driving motor through the connecting bracket.

17. The heat exchange system for the vehicle of claim 1, wherein the autonomous driving controller is fastened to at least two points on a first side of an upper surface of a rear cross member.

* * * * *